March 27, 1934. L. B. SPERRY ET AL 1,952,516
THERMOSTAT
Filed April 30, 1931
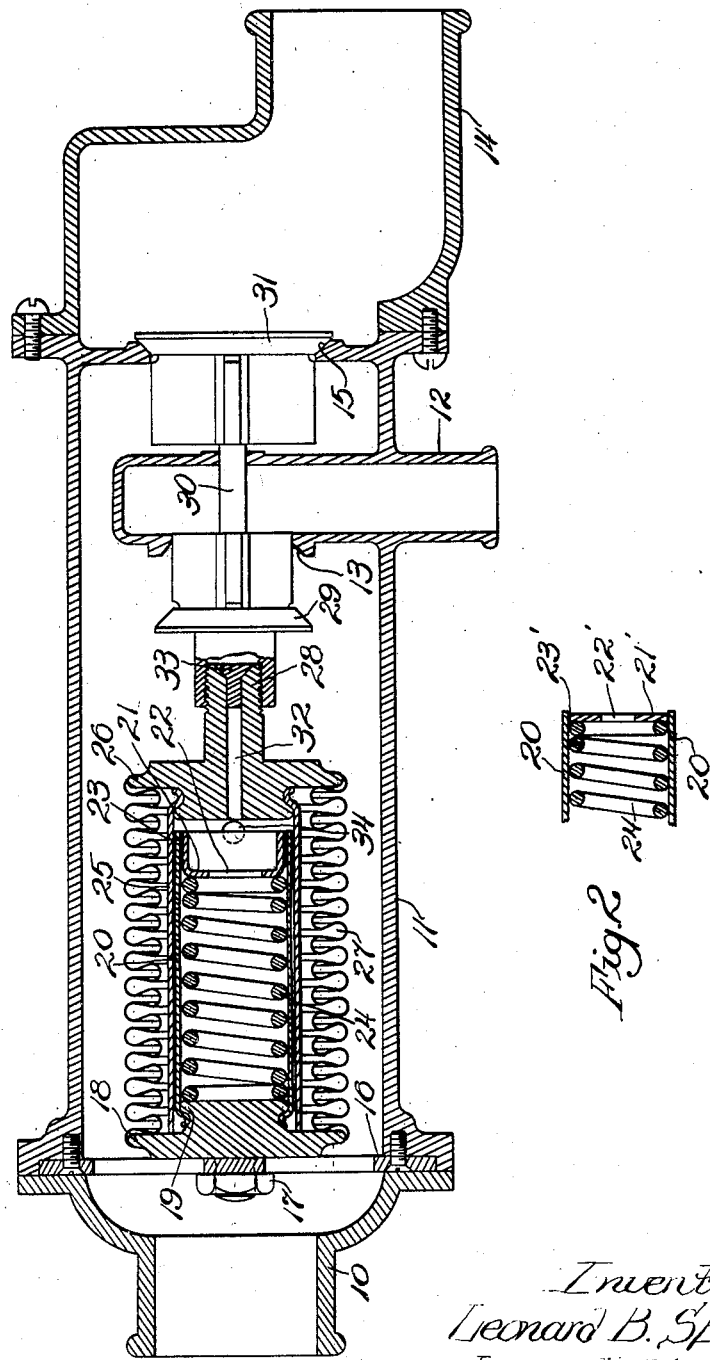

Patented Mar. 27, 1934

1,952,516

UNITED STATES PATENT OFFICE 1,952,516

THERMOSTAT

Leonard B. Sperry, Western Springs, and James L. Yarian, Chicago, Ill., assignors to International Harvester Company, a corporation of New Jersey Application April 30, 1931, Serial No. 534,054

11 Claims. (Cl. 236—34)

The invention relates to thermostatically controlled valve mechanism for regulating the flow of the cooling liquid circulating in the cooling system of an internal combustion engine.

Such mechanisms are now well known in the art, for example, as in the patent to Geisler No. 1,354,740 issued October 5, 1920, the purpose being to effect control automatically for permitting circulation through the engine block per se and temporarily by-passing the radiator; and, eventually, when the proper temperature condition has been reached to make for circulation in a continuous circuit through block and radiator with the by-pass cut out.

The particular improvements in this invention relate to the controlling thermostat, the main object being to provide the bellows of the thermostat with a normally inoperative, enclosed, emergency spring, so that, if for any reason the bellows fails under extreme heat, for example, then the energy of the spring will automatically be available for positively holding a valve or valves in open position to insure the proper circulation of the liquid through the block and radiator in a manner best to cool the motor.

Other objects respecting the details of construction of the improved thermostat will be apparent to those skilled in the art from the complete detailed disclosure presently to be made.

These objects may be achieved by the illustrative example of the invention herein chosen for purposes of disclosure and shown in the accompanying sheet of drawing, wherein:

Figure 1 is a general side sectional view through the thermostatic unit associated with so much of an engine cooling mechanism as is necessary for a complete understanding of the invention; and, Figure 2 is a detail, side sectional view of a modification.

A standard internal combustion engine having a water jacket in the block has not been shown. The same will have the usual outlet water manifold connection generally shown at 10 leading to a housing 11 having communication with a conventional pump by-pass connection 12 having a valve port 13, and also with a conduit 14 leading to a radiator, not shown, by means of a valve port 15. The improved thermostatic control unit is located within the housing 11 to control valves for the two ports 13 and 15 in the manner now to be described.

An open bracket 16 is located between the parts 10 and 11 in any appropriate manner, said bracket having fastened centrally thereto by a nut 17, a header 18 provided with a reduced extension 19, to which an end of a cylindrical sleeve 20 is crimp fitted. The open end of said sleeve carries a cup-shaped member 21 formed wth an opening 22 in its wall part, as shown. Said cup 21 is releasably connected to the inside of the sleeve 20 by a fusible metal, as at 23, such connection being by means of any appropriate solder. This solder will have a melting point as may be predetermined. Between the wall of the cup 21 and the face of the extension 18, the sleeve 20 encloses, under compression, a coil spring 24.

A telescopically slidable, cylindrical sleeve 25 surrounds the aforementioned sleeve 20, and at one end normally loosely abuts the header 18, while its opposite end is crimped fast to a second header 26. The two headers 18 and 26 are connected by a bellows or expansible seal 27, as shown. The header 26 has a threaded stem 28 extending therefrom, which stem has connection with a valve 29 for the port 13 heretofore described. Connected with the valve 29 is a stem 30 passed slidably through the connection 12 for connection to a valve 31 for the port 15. As the valves 29 and 31 are so connected, they must move conjointly whenever actuated.

A thermo-sensitive fluid is introduced into the inside of the sleeve 20, through the stem 28 formed with a bore 32, after which the bore 32 is appropriately sealed by a conventional plug 33. An opening 34 is formed in the outer sleeve 25, and thus the openings 22, 34 insure circulation of the thermo-sensitive fluid freely through the inner sleeve space and also through the bellows space exteriorly of the outer sleeve 25.

In Figure 2 a modification is shown, in which a flat, washer-like disk 21' having an opening 22' takes the place of the cup member 21 shown in Figure 1. The disk at 23' is soldered to the sleeve 20.

In operation it will be assumed that the internal combustion engine has just been started. Thus, the engine is cold, and likewise is this so of the cooling fluid in the cooling system of the engine. The bellows of the thermostatic unit accordingly is contracted, as appears in Figure 1, and, as a consequence, the valve 29 is in open position relative to the valve port 13, while the valve 31 closes the port 15. Obviously then, the pump conduit 12 alone is effective and the water is by-passed with respect to the radiator, so that it will be circulated through the engine block alone. As the engine continues to run, it very quickly now develops heat and, as the cooling water heats up, the thermostat bellows eventually is caused to expand and, as a result, the valve 29 closes port 13, and valve 31 opens port 15. Circulation then is effective through both the engine block and radiator in a manner well understood in this art.

It may be that, under the influence of a critical temperature condition, the bellows of the thermostat fails, because for example, let us say, of a leak causing loss of the thermo-sensitive fluid. If this occurs, definite assurance must be had that the port 13 be positively closed and the port 15 be positively held open. Accordingly, the structure of this invention has provided a safety means to accomplish such desired result.

When a certain predetermined critical temperature condition is reached, the soldered connection 23 melts and, as a result, the energy of spring 24 is released to force the released cup 21 against head 26, such force further acting to push the head 26 to the right, as seen in Figure 1, to close port 13 and positively hold open port 15. The radiator is thus maintained in the cooling circuit and effective to dissipate the heat.

In practice, it sometimes happens that the cup 21 cants and sticks a little, with the result that it is not quickly enough released from its soldered connection. If this happens, it may be desirable to substitute for the cup 21 a thin washer-like disk 21', as shown in Figure 2. Obviously, because of the thinness of such disk, the soldered connection is minimized, and thus the disk 21' must unquestionably be relatively quickly released when the solder 23' melts.

From this detailed disclosure it must now be apparent that a simple, compact, fool-proof thermo-static unit has been provided for the purposes described, which will give definite assurance against failure of an internal combustion engine cooling system having a thermo-statically controlled circulating system.

It is the intention herein to cover all such immaterial changes and departures from the example disclosed as do not fall outside the spirit and scope of the invention.

What is claimed is:

1. A thermo-static control unit comprising a stationary head, a movable head, a bellows connected at respective ends to said heads, valve actuating means connected to the movable head, a telescopic sleeve structure connecting the heads, a spring normally locked in compression within said sleeve structure, said bellows and sleeve structure being loaded with a thermosensitive fluid to normally move the movable head and valve actuating means, and means whereby a predetermined critical temperature releases the energy of the spring to move the movable head upon failure of the bellows.

2. A unit of the kind described comprising two telescopic sleeves, a head at each end of the unit, said heads being relatively movable, a spring inside the sleeves, a stop member fusibly connected to one of the sleeves to hold the spring under compression, an expansible seal enclosing the unit and containing a thermo-sensitive fluid normally to move the heads relatively, said fusible connection automatically releasing at a predetermined temperature caused by failure of the seal to free the spring to cause it to move the heads relatively.

3. A thermostatic control unit comprising a pair of relatively movable members, an expansible seal enclosing the same, said seal containing a thermo-sensitive fluid for operating the relatively movable members within a normal temperature range, and a spring locked in compression in said unit said spring being normally inactive while the thermo-sensitive fluid functions, but releasable upon a critical temperature and leakage of the fluid from the seal to move the relatively movable members away from each other and hold them apart.

4. A thermo-static control unit comprising a stationary head, a movable head, a bellows connected at respective ends to said heads, valve actuating means connected to the movable head, a telescopic means arranged between the heads, spring means normally locked in compression against the stationary head, said bellows and telescopic means being loaded with a thermo-sensitive fluid to normally move the movable head and valve actuating means, and means whereby upon a failure of the bellows and a critical temperature condition the energy of the spring is automatically released to move the movable head.

5. A thermo-static control unit comprising a stationary head, a movable head, a bellows connected at respective ends to said heads, valve actuating means connected to the movable head, two telescopic sleeves arranged between the heads, each sleeve having an end connected to a head, a spring enclosed by the sleeves, said bellows and sleeves being loaded with a thermo-sensitive fluid normally to move the movable head and valve actuating means, and means including a fusible connection to hold the spring normally compressed and inactive whereby upon failure of the bellows and a predetermined critical temperature the spring holding means is fused to release the energy of the spring to move the movable head.

6. A thermo-static control unit comprising a stationary head, a movable head, a bellows connected at respective ends to said heads, valve actuating means connected to the movable head, a sleeve fastened to the stationary head, a sleeve fastened to the movable head, said sleeves being in telescopic relationship inside the bellows, a spring inside the sleeves, a member for holding the spring under compression, fusible means for connecting the member in normal fixed position inside the sleeves, valve operating means connected with the movable head, said fusible means having a melting point at a predetermined temperature, said bellows and sleeves being loaded with a thermo-sensitive fluid which normally moves the movable head and valve operating means, said predetermined temperature and a failure of the bellows causing the fusible means to melt whereupon the member is freed to cause the energy of the spring to be released for moving the movable head.

7. A thermo-static control unit comprising a stationary head, a movable head, a bellows connected at respective ends to said heads, valve actuating means connected to the movable head, a sleeve fastened to the stationary head, a sleeve fastened to the movable head, said sleeves being in telescopic relationship inside the bellows, a spring inside the sleeves, a member for holding the spring under compression, fusible means for releasably connecting the member in normal fixed position with respect to the sleeve fastened to the stationary head, valve operating means connected with the movable head, said fusible means having a melting point at a predetermined temperature, said bellows and sleeves being loaded with a thermo-sensitive fluid which normally moves the movable head and valve actuating means, said predetermined temperature and failure of the bellows causing the fusible means to melt whereupon the member is freed to cause the energy of the spring to be released for moving the movable head.

8. A thermo-static control unit comprising a stationary head, a movable head, a bellows connected at respective ends to said heads, valve actuating means connected to the movable head, a fixed sleeve fastened to the stationary head, a movable sleeve fastened to the movable head, said sleeves being in telescopic relationship inside the bellows, a spring inside the sleeves, means for locking the spring under compression and inactive inside the sleeve connected to the stationary head, fusible means connecting the lock means inside the stationary sleeve, valve operating means connected with the movable head, said fusible connection having a melting point at a predetermined high temperature, said bellows and sleeves being loaded with a thermo-sensitive fluid which normally moves the movable head and valve operating means, said predetermined temperature and failure of the bellows causing the fusible connection to melt whereupon the lock means is freed to cause the energy of the spring to be released for moving the movable head and sleeve.

9. A unit of the kind described comprising two telescopic sleeves, a head at each end of the unit, said heads being relatively movable, a spring inside the sleeves, means to hold the spring under compression, a bellows enclosing the unit, said bellows being loaded with a thermo-sensitive fluid normally to move said heads relatively, and an automatically releasable connection for said means to free the spring to cause it to move the heads relatively when the bellows fails by reason of leakage and a critical temperature.

10. A unit of the kind described comprising two telescopic sleeves with a stationary head at one end of the unit and a movable head at the other end of the unit, a spring inside the stationary sleeve, means in the stationary sleeve to hold the spring under compression therein, an expansible seal enclosing the unit and containing a thermo-sensitive fluid normally to move the movable head, and an automatically releasable connection for said means to free the spring to cause it to move the movable head and sleeve, said automatic action taking place when a critical temperature occurs and the seal fails.

11. A thermo-static unit of the kind described comprising two telescopic sleeves, a head at each end of the unit, said heads being relatively movable, a bellows connecting the heads and enclosing the sleeves, said unit being loaded with a thermo-sensitive fluid which normally operates the heads relatively, a spring inside the sleeves, means to hold the spring inactive and under compression, and an automatically releasable connection for said means to free the spring to cause it to move the heads relatively when a critical temperature results and the bellows fails.

LEONARD B. SPERRY.
JAMES L. YARIAN.